United States Patent Office 3,410,863
Patented Nov. 12, 1968

3,410,863
OXADIAZOLONE COMPOUNDS
Roger Boesch, Vitry-sur-Seine, and Jean Metivier, Paris, France, assignors to Rhone-Poulenc S.A., Paris, France, a corporation of France
No Drawing. Filed Aug. 19, 1965, Ser. No. 481,149
Claims priority, application France, Aug. 21, 1964, 985,885
12 Claims. (Cl. 260—307)

ABSTRACT OF THE DISCLOSURE

The invention provides new 3-phenylcarbamoyl-1,3,4-oxadiazol-2-ones, optionally substituted in the 5-position, which are useful in agriculture against foliar parasites.

---

This invention relates to new oxadiazolone compounds, a process for their preparation and compositions containing them.

The new oxadiazolone compounds of the present invention are those of the general formula:

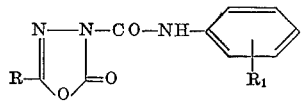

I wherein R represents a hydrogen atom or an alkyl group, a phenyl group which may carry a halogen atom or an alkyl, alkoxy or hydroxyl substituent, an aralkyl group containing 7 to 12 carbon atoms (preferably benzyl), a cycloalkyl group containing 3 to 6 carbon atoms, a five- or six-membered heterocyclyl group with one or more hetero atoms selected from oxygen, sulphur and nitrogen, or a cyano, alkoxy, alkylthio, alkoxyalkyl, alkylthioalkyl, alkoxycarbonyl, alkylcarbamoyl, alkanesulphonyl or alkanesulphonylalkyl group, and

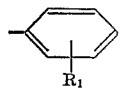

represents phenyl or phenyl carrying at least one substituent selected from halogen atoms, and alkyl, alkenyl, alkoxy, alkenyloxy, alkylthio, alkenylthio, trifluoromethyl, cyano and dialkylamino groups. It is to be understood that in this specification and accompanying claims the alkyl, alkoxy, alkane and alkenyl groups referred to contain at most six carbon atoms.

According to a feature of the invention, the oxadiazolone compounds of Formula I are prepared by the process which comprises reacting an isocyanate of the formula:

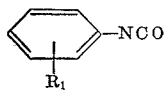

II (wherein

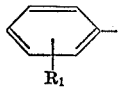

is as hereinbefore defined) with a 1,3,4-oxadiazol-2-one of the formula:

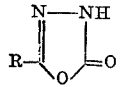

III wherein R is as hereinbefore defined. The reaction is preferably carried out in an inert organic solvent, such as an aromatic hydrocarbon (e.g. benzene or toluene) at a temperature between ambient temperature, i.e. 10°–30° C., and the reflux temperature of the reaction mixture. It is advantageous to employ a tertiary organic base, for example triethylamine, as condensing agent.

The 1,3,4-oxadiazol-2-one starting materials of Formula III can be obtained by the action of phosgene on a hydrazide of the formula R—CONHNH$_2$, wherein R is as hereinbefore defined. The reaction is preferably carried out in water.

The oxadiazolone compounds of Formula I possess remarkable fungicidal properties which are especially useful in agriculture; in particular, they are particularly active against foliar parasites such as apple-scab, potato blight and tobacco mildew. Preferred compounds are those in which R represents a hydrogen atom or an alkyl, phenyl, cycloalkyl, alkoxyalkyl, alkylthioalkyl, alkoxycarbonyl, alkylcarbamoyl or alkanesulphonylalkyl group, and the grouping

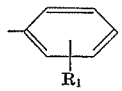

represents phenyl or phenyl carrying at least one substituent selected from halogen atoms and alkyl, alkoxy, alkenyloxy, trifluoromethyl and dialkylamino groups. Of outstanding utility as fungicides are those compounds of Formula I in which R represents an alkyl group of 2 to 4 carbon atoms and R$_1$ is in the 4-position of the benzene ring and represents a methoxy or dimethylamino group; in particular, 3-(4-methoxyphenyl)carbamoyl-5-butyl-1,3,4-oxadiazol-2-one, 3-(4-methoxyphenyl)carbamoyl-5-tert.-butyl - 1,3,4 - oxadiazol-2-one, 3-(4-dimethylaminophenyl)carbamoyl-5-tert.-butyl - 1,3,4-oxadiazol-2-one, 3-(4 - dimethylaminophenyl)carbamoyl-5-isopropyl-1,3,4-oxadiazol-2-one, 3 - (4-methoxyphenyl)carbamoyl-5-ethyl - 1,3,4 - oxadiazol - 2 - one, 3-(4-methoxyphenyl)carbamoyl-5-propyl - 1,3,4 - oxadiazol - 2 - one, 3-(4-methoxyphenyl)carbamoyl - 5 - isopropyl - 1,3,4 - oxadiazol-2-one, 3-(4-dimethylaminophenyl)carbamoyl-5-ethyl-1,3,4-oxadiazol-2-one, 3-(4-dimethylaminophenyl)carbamoyl-5-propyl-1,3,4-oxadiazol-2-one, and 3-(4-dimethylaminophenyl)carbamoyl - 5 - butyl-1,3,4-oxadiazol-2-one, especially the four first-mentioned compounds.

According to a further feature of the present invention the are provided fungicidal compositions containing at least one oxadiazolone compound of Formula I in association with one or more diluents compatible with the oxadiazolone and suitable for use in agricultural fungicidal compositions. Preferably the compositions contain between 0.005 and 90% by weight of oxadiazolone. The compositions may be solid if there is employed a powdered solid compatible diluent such as talc, calcined magnesia, kieselguhr, tricalcium phosphate, powdered cork, absorbent charcoal, or a clay such as kaolin or bentonite. Instead of a solid diluent, there may be used a liquid in which the oxadiazolone is dissolved or dispersed. The compositions may thus take the form of suspensions, emulsions or solutions in organic or aqueous-organic media, for example aromatic hydrocarbons such as toluene or xylene or mineral, animal or vegetable oils, or mixtures of these diluents. The compositions in the form of suspensions, emulsions or solutions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxy groups by condensation with ethylene oxide. It is preferable to use agents of the non-ionic type because they are not sensitive to electrolytes. When desired, emulsions of the oxadiazolones may be used in the form of self-emulsifying concentrates containing the active substance dissolved in the emulsifying agent or in a solvent containing an emulsifying agent compatible with the oxadiazolone and solvent, a simple addition of water to such concentrates producing compositions ready for use.

The solid compositions are preferably prepared by grinding the oxadiazolone with solid diluent, or by impregnating the solid diluent with a solution of the oxadiazolone in a volatile solvent, evaporating the solvent, and if necessary grinding the product so as to obtain a powder, and may optionally incorporate a wetting or dispersing agent, for example of the types hereinbefore described.

The oxadiazolone compounds of Formula I are preferably employed for fungicidal purposes in a quantity of 100 to 200 g. of active substance per hectolitre of water.

The following three examples illustrate the preparation of oxadiazolone compounds of the invention.

Example I

To a solution of 5-propyl-1,3,4-oxadiazol-2-one (12.8 g.) in anhydrous benzene (80 cc.) there are added triethylamine (3 drops) and then, over a period of 5 minutes, a solution of phenylisocyanate (11.9 g.) in anhydrous benzene (20 cc.). The temperature rises to 32° C. The reaction mixture is heated under reflux for 2 hours and then cooled to 20° C. The benzene is distilled off in vacuo to yield 3-phenylcarbamoyl-5-propyl-1,3,4-oxadiazol-2-one (24 g.) which, after recrystallisation from cyclohexane, melts at 97° C.

The 5-propyl-1,3,4-oxadiazol-2-one (B.P. 105–107° C./ 0.1 mm Hg) employed as starting material is prepared according to A. Nornow and K. Bruncken, Berichte, 82, 121 (1949), by the action of phosgene on butyryl-hydrazine.

Example II

A mixture of 5-methyl-1,3,4-oxadiazol-2-one (5 g.) and 4-dimethylaminophenylisocyanate (8.1 g.) in anhydrous benzene (50 cc.) is heated under reflux for 2 hours in the presence of triethylamine (3 drops). The solution is cooled to 20° C., and the precipitate formed filtered off, washed with benzene and dried. There is thus obtained 3-(4-dimethylaminophenyl)carbamoyl-5-methyl-1,3,4-oxadiazol-2-one (12.5 g.) which, after recrystallisation from 1,2-dichloroethane, melts at 202° C.

The 5-methyl-1,3,4-oxadiazol-2-one (M.P. 114° C.) employed as starting material is prepared according to A. Dornow and K. Bruncken, loc. cit.

Example III

To a solution of 5-tert.-butyl-1,3,4-oxadiazol-2-one (14.2 g.) in anhydrous benzene (80 cc.) there is added, over a period of 5 minutes and in the presence of triethylamine (3 drops), a solution of 4-methoxyphenylisocyanate (14.9 g.) in anhydrous benzene (20 cc.). The reaction mixture is stirred for 4 hours at ambient temperature and then the solvent is removed by distillation in vacuo. There is obtained 3-(4-methoxyphenyl)carbamoyl-5-tert.-butyl-1,3,4-oxadiazol-2-one (30 g.) which, after recrystallisation from a mixture of cyclohexane and benzene, melts at 118° C.

The 5-tert.-butyl-1,3,4-oxadiazol-2-one (B.P. 103–104° C./0.05 mm. Hg) employed as starting material is prepared by the action of phosgene on trimethylacetylhydrazine.

By proceeding as described in Examples I to III and employing appropriate starting materials of Formulae II and III, there are also obtained the products identified in the following table:

TABLE

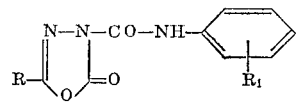

| —R | —R₁ | Position of R₁ | Melting point, °C. |
| --- | --- | --- | --- |
| —H | —OCH₃ | 4 | 158–159 |
| —CH₃ | —H | ---------- | 125 |
| —CH₃ | —OCH₃ | 4 | 163 |
| —C₂H₅ | —H | ---------- | 135 |
| —C₂H₅ | —OCH₃ | 4 | 111 |
| —C₂H₅ | —N(CH₃)₂ | 4 | 138 |
| —C₃H₇ | —OCH₃ | 4 | 97 |
| —C₃H₇ | —N(CH₃)₂ | 4 | 125 |
| —CH(CH₃)₂ | —H | ---------- | 74–75 |
| —CH(CH₃)₂ | —OCH₃ | 4 | 113–114 |
| —CH(CH₃)₂ | —N(CH₃)₂ | 4 | 95–96 |
| —C₄H₉ | —H | ---------- | 73 |
| —C₄H₉ | —CH₃ | 4 | 66 |
| —C₄H₉ | —OCH₃ | 4 | 84 |
| —C₄H₉ | —N(CH₃)₂ | 4 | 129 |
| —C₄H₉ | —Cl | 4 | 127.5–128 |
| —C₄H₉ | —CF₃ | 3 | 92 |
| —C(CH₃)₃ | —H | ---------- | 102 |
| —C(CH₃)₃ | —OCH₃, —OCH₃ | 3 and 4 | 140 |
| —C(CH₃)₃ | —OCH₂—CH=CH₂ | 4 | 93 |
| —C(CH₃)₃ | —N(CH₃)₂ | 4 | 127.5–128 |
| —C(CH₃)₃ | —Cl | 4 | 128 |
| —C(CH₃)₃ | —CF₃ | 3 | 120 |
| —C₅H₁₁ | —H | ---------- | 82 |
| —C₅H₁₁ | —OCH₃ | 4 | 80 |
| —H | —H | ---------- | 130 |
| —CH₂OCH₃ | —H | ---------- | 103 |
| —CH₂OCH₃ | —OCH₃ | 4 | 118 |
| —COOC₂H₅ | —H | ---------- | 150–151 |
| —COOC₂H₅ | —OCH₃ | 4 | 156 |
| —C₆H₅ | —OCH₃ | 4 | 158 |
| —CONHCH₃ | —OCH₃ | 4 | 190 |
| —CH(CH₃)SCH₃ | —OCH₃ | 4 | 120 |
| —CH₂SCH₃ | —H | ---------- | 115 |
| —CH₂SCH₃ | —OCH₃ | 4 | 119.5–120 |
| —CH(CH₃)SCH₃ | —H | ---------- | 85 |

| —R | —R₁ | Position of R₁ | Melting point, °C |
|---|---|---|---|
| —C(CH₃)₂C₃H₇ | —OCH₃ | 4 | 66 |
| —CH(CH₃)SC₄H₉ | —OCH₃ | 4 | 96 |
| —CH(CH₃)SCH₂CH₂CH(CH₃)₂ | —OCH₃ | 4 | 104 |
| —CH(CH₃)SCH₂CH₂CH(CH₃)₂ | —H | | Oil |
| —C(CH₃)₂C₃H₇ | —H | | Oil |
| —CH(CH₃)SO₂CH₂CH₂CH(CH₃)₂ | —OCH₃ | 4 | 124 |
| —CH(CH₃)SCH(CH₃)₂ | —OCH₃ | 4 | 100 |
| —C₄H₉ | —OCH₃ | 2 | 106 |
| —C(CH₃)₂OCH₃ | —OCH₃ | 4 | 115 |
| —C₆H₁₁ cyclo | —OCH₃ | 4 | 128 |
| —C(CH₃)₂OC₂H₅ | —OCH₃ | 4 | 101 |
| —C₄H₉ | —OC₂H₅ | 4 | 114.5 |
| —C₄H₉ | —OCH(CH₃)₂ | 4 | 99.5–100 |
| —C₄H₉ | —OC(CH₃)₃ | 4 | 116 |
| —C₄H₉ | —OC₃H₇ | 4 | 83 |
| —C₄H₉ | —OCH₂CH=CH₂ | 4 | 98 |
| —C₄H₉ | —OC₄H₉ | 4 | 74–75 |
| —C₄H₉ | —C(CH₃)₃ | 4 | 121 |
| —C₄H₉ | —OCH(CH₃)C₂H₅ | 4 | 84–85 |
| —C₄H₉ | —O(CH₂)₂CH(CH₃)₂ | 4 | 97–98 |

The following examples illustrate fungicidal compositions according to the present invention.

Example IV

To 3 - (4 - methoxyphenyl)carbamoyl - 5 - butyl-1,3,4-oxadiazol-2-one (100 g.) there is added talc (95 g.) and a condensation product of ethylene oxide with p-octylphenol (5 g.). After grinding, the powder obtained can be used, after dilution with water to give 200 g. of powder per 100 litres of water, for protecting plants against attack by fungi.

Example V

To 3 - (4 - methoxyphenyl)carbamoyl - 5 butyl-1,3,4-oxadiazol-2-one (500 g.) there are added calcium lignosulphite (25 g.) and kaolin (475 g.). After grinding and screening, the powder obtained can be used, after dilution with water to give 400 g. of powder per 100 litres of water, to protect plants against attack by fungi.

According to another feature of the invention, a method for the treatment of plants or trees infected by fungi, or to prevent infection by fungi, comprises applying to the plants or trees a fungicidal composition containing at least one oxadiazolone compound of general Formula I. Apple trees, potato plants or tobacco plants may, for example, be treated to control, or prevent infection by, apple-scab, or potato blight or tobacco mildew, respectively.

We claim:

1. Oxadiazolone compounds of the formula:

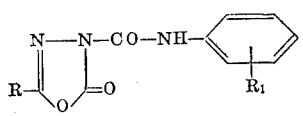

wherein R represents hydrogen, alkyl, phenyl, cycloalkyl containing 3 through 6 carbon atoms, alkoxyalkyl, alkylthioalkyl, alkoxycarbonyl, alkylcarbamoyl or alkanesulphonylalkyl, and the grouping

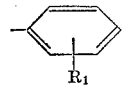

represents phenyl or phenyl carrying at least one substituent selected from halogen, alkyl, alkoxy, alkenyloxy, trifluoromethyl and dialkylamino, the said alkyl, alkoxy, alkane and alkenyl groups containing at most six carbon atoms.

2. Oxadiazolone compounds according to claim 1 wherein R represents alkyl of 2 through 4 carbon atoms and R₁ is in the 4-position of the benzene ring and represents methoxy or dimethylamino.

3. 3 - (4 - methoxyphenyl)carbamoyl - 5 - butyl-1,3,4-oxadiazol-2-one.

4. 3 - (4 - methoxyphenyl)carbamoyl - 5 - tert. - butyl-1,3,4-oxadiazol-2-one.

5. 3 - (4 - dimethylaminophenyl)carbamoyl - 5 - tert.-butyl-1,3,4-oxadiazol-2-one.

6. 3 - (4 - dimethylaminophenyl)carbamoyl - 5 - isopropyl-1,3,4-oxadiazol-2-one.

7. 3 - (4 - methoxyphenyl)carbamoyl - 5 - ethyl - 1,3,4-oxadiazol-2-one.

8. 3 - (4 - methoxyphenyl)carbamoyl - 5 - propyl-1,3,4-oxadiazol-2-one.

9. 3 - (4 - methoxyphenyl)carbamoyl - 5 - isopropyl-1,3,4-oxadiazol-2-one.

10. 3-(4 - dimethylaminophenyl)carbamoyl - 5 - ethyl-1,3,4-oxadiazol-2-one.

11. 3 - (4 - dimethylaminophenyl)carbamoyl - 5 - propyl-1,3,4-oxadiazol-2-one.

12. 3-(4 - dimethylaminophenyl)carbamoyl - 5 - butyl-1,3,4-oxadiazol-2-one.

References Cited

UNITED STATES PATENTS 3,337,575  8/1967  Boesch et al. _____ 260—307
3,141,023  7/1964  Bousquet _____ 260—308

ALTON D. ROLLINS, *Primary Examiner.*